(12) United States Patent
Ferman

(10) Patent No.: US 8,805,074 B2
(45) Date of Patent: Aug. 12, 2014

(54) METHODS AND SYSTEMS FOR AUTOMATIC EXTRACTION AND RETRIEVAL OF AUXILIARY DOCUMENT CONTENT

(75) Inventor: Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 849 days.

(21) Appl. No.: 12/891,000

(22) Filed: Sep. 27, 2010

(65) Prior Publication Data

US 2012/0076413 A1 Mar. 29, 2012

(51) Int. Cl.
*G06K 9/34* (2006.01)

(52) U.S. Cl.
USPC ........... 382/173; 382/170; 382/175; 382/177; 358/538; 358/453; 358/462

(58) Field of Classification Search
USPC .......... 382/171, 190, 209, 219, 278; 358/537, 358/538, 453, 462
See application file for complete search history.

(56) References Cited

U.S. PATENT DOCUMENTS

| | | | | |
|---|---|---|---|---|
| 5,287,271 A | * | 2/1994 | Rosenbaum | 705/7.12 |
| 5,495,581 A | | 2/1996 | Tsai | |
| 5,754,697 A | * | 5/1998 | Fu et al. | 382/232 |
| 5,818,524 A | * | 10/1998 | Juen | 348/231.99 |
| 5,835,222 A | * | 11/1998 | Herzinger | 356/369 |
| 5,956,145 A | * | 9/1999 | Green et al. | 356/364 |
| 6,817,231 B2 | * | 11/2004 | Yasutake et al. | 73/105 |
| 6,912,555 B2 | | 6/2005 | Lemon et al. | |
| 7,027,038 B2 | | 4/2006 | Carro | |
| 7,197,697 B1 | | 3/2007 | Tsukamoto | |
| 7,268,749 B2 | * | 9/2007 | Marcotte et al. | 345/60 |
| 7,302,638 B1 | | 11/2007 | Wolfe | |
| 7,426,312 B2 | * | 9/2008 | Dance et al. | 382/254 |
| 7,441,010 B2 | | 10/2008 | Allan | |
| 7,472,338 B2 | | 12/2008 | Carro | |
| 7,530,023 B2 | | 5/2009 | Carro | |
| 7,610,192 B1 | * | 10/2009 | Jamieson | 704/9 |
| 7,781,729 B2 | * | 8/2010 | Wang et al. | 250/282 |
| 7,916,152 B2 | * | 3/2011 | Jones et al. | 345/589 |
| 8,015,418 B2 | * | 9/2011 | Warnock et al. | 713/193 |
| 8,233,742 B2 | * | 7/2012 | Masuda | 382/294 |
| 8,548,254 B2 | * | 10/2013 | Ishikawa et al. | 382/217 |
| 8,587,826 B2 | * | 11/2013 | Alimpich et al. | 358/1.9 |
| 2007/0180357 A1 | | 8/2007 | McGatha et al. | |
| 2007/0180358 A1 | | 8/2007 | McGatha et al. | |

FOREIGN PATENT DOCUMENTS

| | | |
|---|---|---|
| JP | 2240788 A | 9/1990 |
| JP | 3296883 A | 12/1991 |
| JP | 10240901 A | 9/1998 |
| JP | 00/090117 A | 3/2000 |

* cited by examiner

*Primary Examiner* — Yosef Kassa
(74) *Attorney, Agent, or Firm* — Kristine Elizabeth Matthews; David C. Ripma

(57) ABSTRACT

Aspects of the present invention are related to systems and methods for automatically extracting, from a document image, references to relevant external content and automatically retrieving the external content associated with the references.

17 Claims, 7 Drawing Sheets

FIG. 6

METHODS AND SYSTEMS FOR AUTOMATIC EXTRACTION AND RETRIEVAL OF AUXILIARY DOCUMENT CONTENT

FIELD OF THE INVENTION

Embodiments of the present invention relate generally to automated document analysis and, in particular, to methods and systems for automatically extracting, from a document image, references to relevant external content and automatically retrieving the external content associated with the references.

BACKGROUND

It is not uncommon for a document to contain a reference to relevant external content. Exemplary references, also referred to as links, include a reference citation, a URL to a website, an annotation to an external resource, a bibliographic entry and other indications of relevant external content. Accessing the external content referenced in a document may necessitate a user explicitly following a link or entering information into a search engine or performing other cumbersome processes which may render retrieval of the external content a tedious process. Methods and systems for automatic analysis of a document image to extract references to and to retrieve external content may be desirable.

SUMMARY

Some embodiments of the present invention comprise methods and systems for automatically extracting, from a document image, references to relevant external content and automatically retrieving the external content associated with the references.

According to a first aspect of the present invention, the inherent layout of a structured document may be exploited to automatically extract from, and analyze portions of, a document image to provide for the retrieval of a referenced external content.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 6 is a picture depicting an exemplary binarization of the exemplary cropped, corrected image shown in FIG. 5;

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

It is not uncommon for a document to contain a reference to relevant external content. Exemplary references, also referred to as links, include a reference citation, a URL to a website, an annotation to an external resource, a bibliographic entry and other indications of relevant external content. Accessing the external content referenced in a document may necessitate a user explicitly following a link or entering information into a search engine or performing other cumbersome processes which may render retrieval of the external content a tedious process. Methods and systems for automatic analysis of a document image to extract references to and to retrieve external content may be desirable.

Some embodiments of the present invention may comprise methods and systems for automatic analysis of a document image to extract references to and to retrieve external content. Many documents may substantially adhere to a well-defined and consistent layout. For example, forms, technical manuscripts, USPTO (United States Patent and Trademark Office) patent documents, for example, patent documents and published patent application documents, and other documents may each have a substantially consistent format across different instances.

Figure 1:
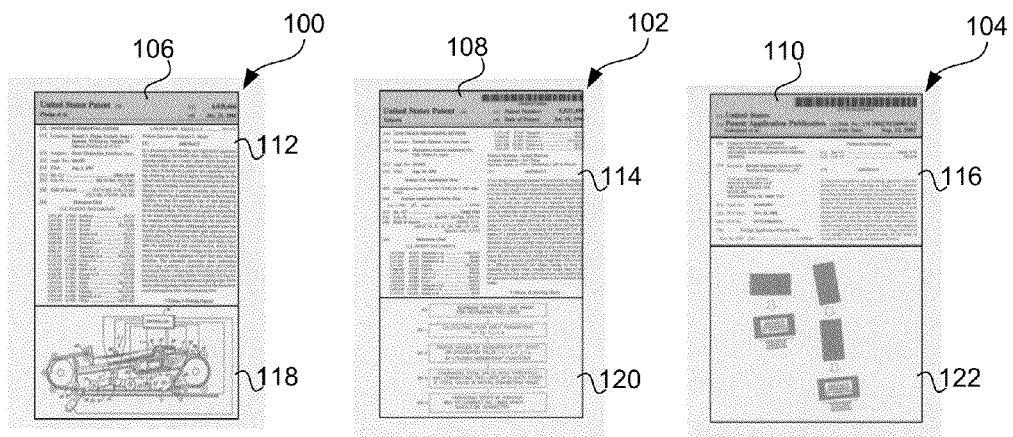
FIG. 1 shows exemplary instances of a structured document type.

FIG. 1 depicts three exemplary instances 100, 102, 104 of a structured document type. The exemplary documents shown in FIG. 1 are the front, also considered title, pages of three USPTO patent documents, for example, a patent or a published patent application. The title page of a patent, or published patent application, comprises detailed bibliographic data that includes the document number, title, inventors, references and abstract. Each bibliographic data field is denoted by a unique INID (Internationally agreed Numbers for the Identification of (bibliographic) Data) code, as specified by the WIPO (World Intellectual Property Organization)

publication Standards ST.9. A USPTO patent document title page comprises three distinct regions: a header region 106, 108, 110 at the top of the page; a main body region 112, 114, 116 in the middle portion of the page; and, optionally, a sample figure region 118, 120, 122 at the bottom of the page.

Figure 2:
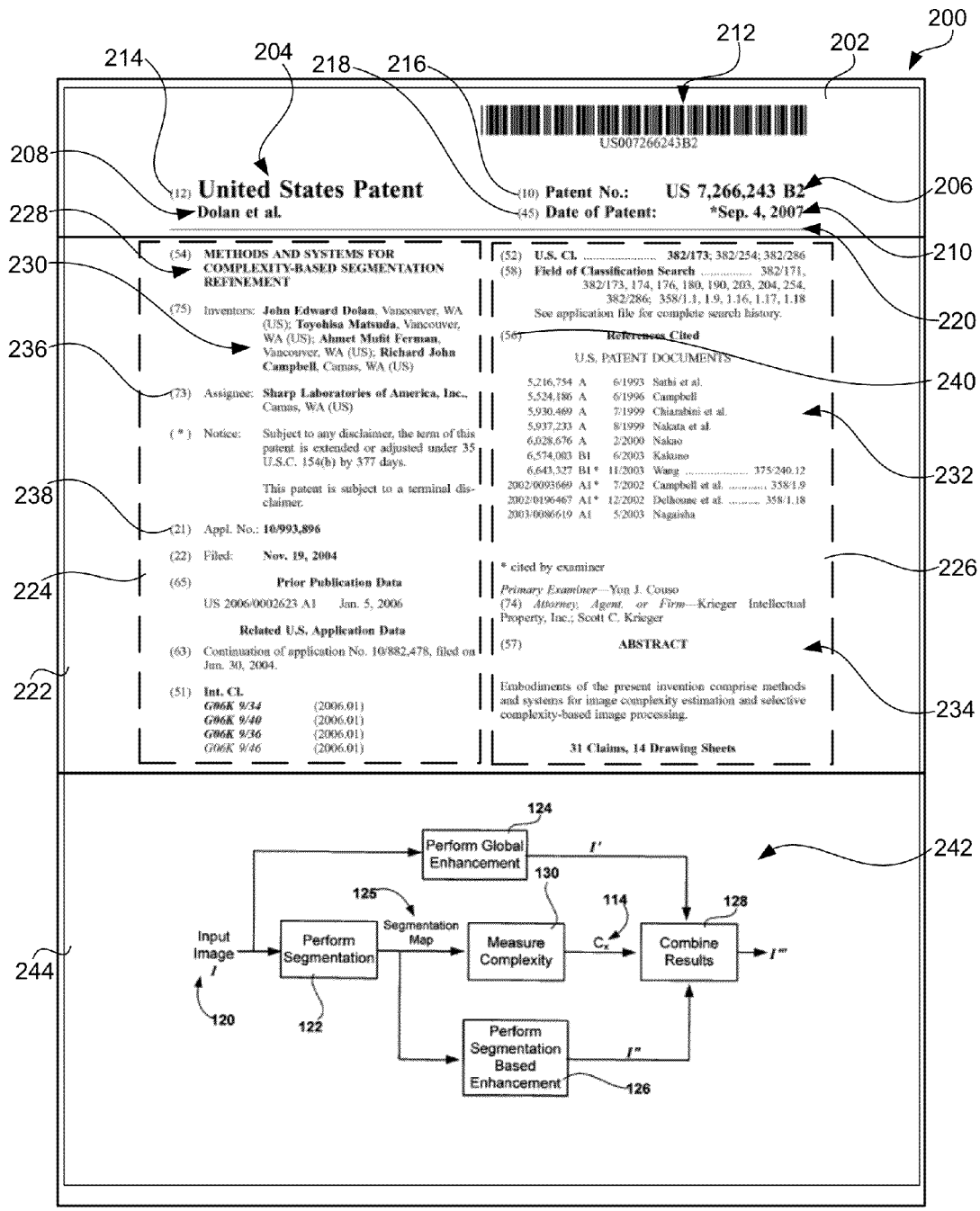
FIG. 2 is a picture illustrating a structured document layout.

As illustrated in FIG. 2, for an exemplary patent document title page 200, the header region 202, indicated by the topmost out-lining rectangle, contains the document type 204, the document number 206, the first inventor's last name 208, the date of publication or issuance 210, and a barcode 212 that encodes the document number. Several INIDs 214, 216, 218 are present in the header region 202 also. A horizontal line 220 separates the header region 202 from the main body region 222, indicated by the middle out-lining rectangle. The main body region 222 is formatted into two columns 224, 226, indicated by dashed-line out-lining rectangles, and includes a majority of the bibliographic data fields, for example, the title 228, the full names of the inventors 230, cited references 232 and the abstract of the invention 234. The main body region 222 also includes several INIDs, for example, an INID 236 identifying the field associated with the assignee, an INID 238 identifying the field associated with the application number and an INID 240 identifying the field associated with the cited references. A sample FIG. 242 may be shown in a sample figure region 244 in the bottom portion of the title page 200.

In some embodiments of the present invention, the inherent layout of a structured document may be exploited to automatically extract from, and analyze portions of, the document image to provide for the retrieval of the referenced external content.

Figure 3:
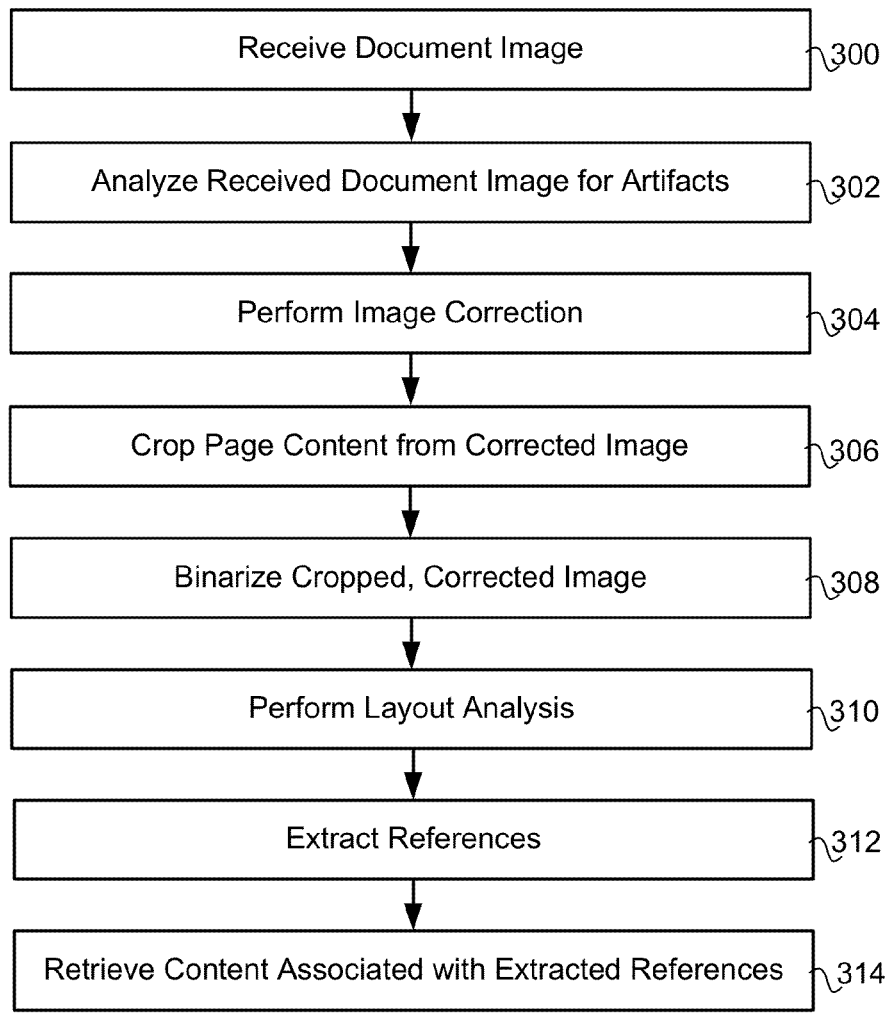
FIG. 3 is a chart showing exemplary embodiments of the present invention comprising layout analysis, reference extraction and content retrieval.

Some embodiments of the present invention may be understood in relation to FIG. 3. A document image may be received 300, and the received document image may be analyzed 302 for artifacts. The received document image may be associated with a structured document. The artifact analysis may comprise determination of the presence of an artifact and the estimation of artifact parameters. Exemplary artifacts may include skew, geometric distortion, rotation from nominal viewing orientation and other artifacts which may require correction. Image correction may be performed 304 on the received document image to correct for detected artifacts.

In some embodiments of the present invention, estimation of document skew may be performed according to the systems and methods disclosed in U.S. patent application Ser. No. 12/729,128, entitled "Methods and Systems for Estimation of Document Skew in an Image," filed on Mar. 22, 2010, which is hereby incorporated by reference herein in its entirety.

In alternative embodiments of the present invention, estimation of document skew may be performed according to methods and systems known in the art.

In some embodiments of the present invention, determination of document orientation may be performed according to the systems and methods disclosed in U.S. patent application Ser. No. 12/164,985, entitled "Methods and Systems for Identifying Digital Image Characteristics," filed on Jun. 30, 2008, which is hereby incorporated by reference herein in its entirety.

In some embodiments of the present invention, determination of document orientation may be performed according to the systems and methods disclosed in U.S. patent application Ser. No. 12/126,514, entitled "Methods and Systems for Identifying the Orientation of a Digital Image," filed on May 23, 2008, which is hereby incorporated by reference herein in its entirety.

In some embodiments of the present invention, determination of document orientation may be performed according to the systems and methods disclosed in U.S. patent application Ser. No. 12/239,685, entitled "Methods and Systems for Locating Text in a Digital Image," filed on Sep. 26, 2008, which is hereby incorporated by reference herein in its entirety.

In alternative embodiments of the present invention, determination of document orientation may be performed according to methods and systems known in the art.

The printed content in the corrected document image may be cropped 306 from the corrected document image. In some embodiments, a minimum bounding box that encompasses the printed content on the corrected document image may be determined in the cropping processing.

In some embodiments of the present invention, determination of the content boundaries for cropping may be performed according to the systems and methods disclosed in U.S. patent application Ser. No. 12/175,386, entitled "Methods and Systems for Content-Boundary Detection," filed on Jul. 17, 2008, which is hereby incorporated by reference herein in its entirety.

In alternative embodiments of the present invention, determination of the content boundaries for cropping may be performed according to methods and systems known in the art.

The cropped, corrected image may be binarized 308.

In some embodiments of the present invention, binarization may be performed according to the systems and methods disclosed in U.S. patent application Ser. No. 12/238,375, entitled "Methods and Systems for Locating Text in a Digital Image," filed on Sep. 25, 2008, which is hereby incorporated by reference herein in its entirety.

In alternative embodiments of the present invention, binarization may be performed according to methods and systems known in the art.

In some embodiments of the present invention, binarization may comprise a global method. In alternative embodiments of the present invention, binarization may be locally adaptive.

Layout analysis may be performed 310 on the cropped, corrected, binary image, which may be denoted:

$$I_B' = \text{Binarized}[\{I(x,y) | x_L \leq x \leq x_R, y_T \leq y \leq y_B\}],$$

where $I(x, y)$ may denote a corrected image value at spatial coordinates $(x, y)$ and $x_L$, $x_R$, $y_T$ and $y_B$ may define the left, right, top and bottom edges, respectively, of the minimum bounding box of the image content, for an image-coordinate origin in the upper-right corner of the image. The layout analysis may be performed 310 in accordance with the inherent layout of the structured document type associated with the received image. Based on the layout analysis, references to external content may be extracted 312, and the external content may be retrieved 314.

Embodiments of the present invention may be described in relation to an exemplary structured document type, a USPTO patent document. The following description is for illustration and is not intended to limit the present invention.

Figure 4:
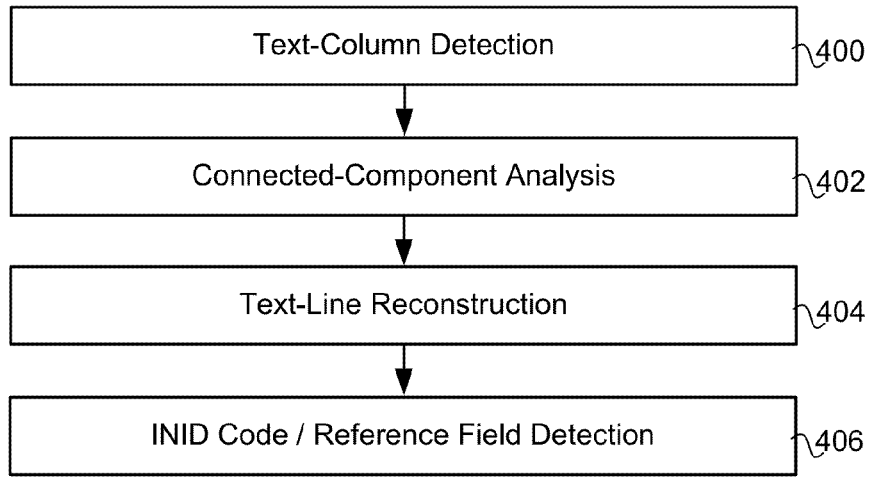
FIG. 4 is a chart showing exemplary embodiments of the present invention comprising layout analysis of a USPTO patent document title page.
Figure 5:
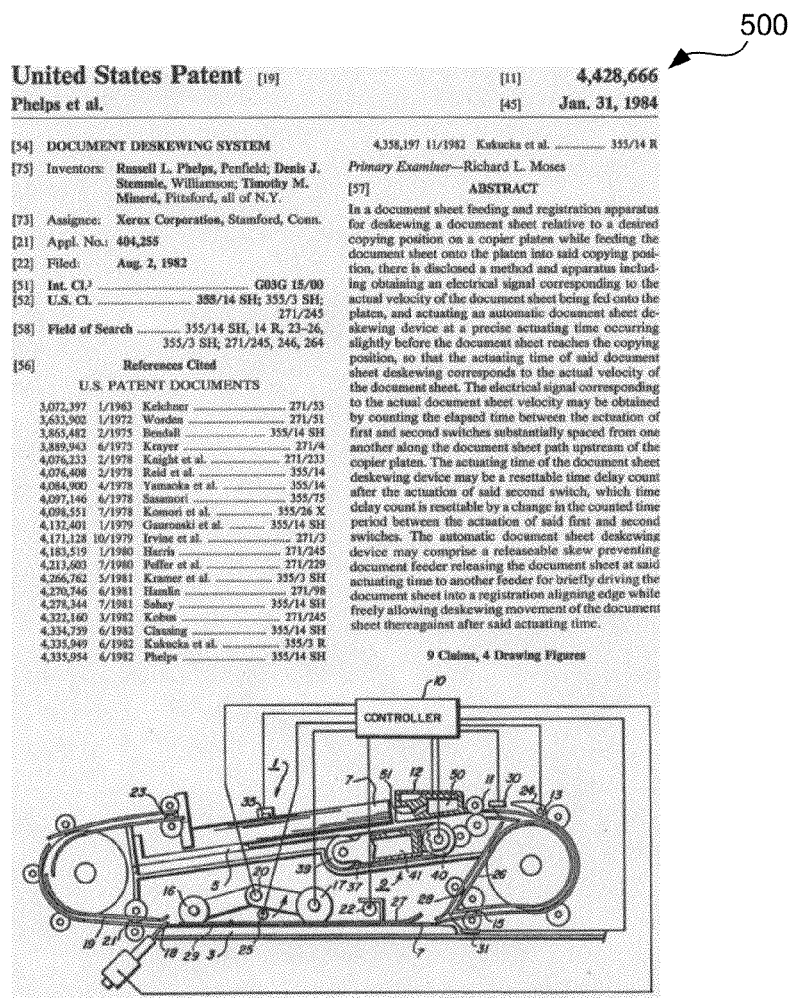
FIG. 5 is a picture depicting an exemplary cropped, corrected image of a USPTO patent document title page.
Figure 6:
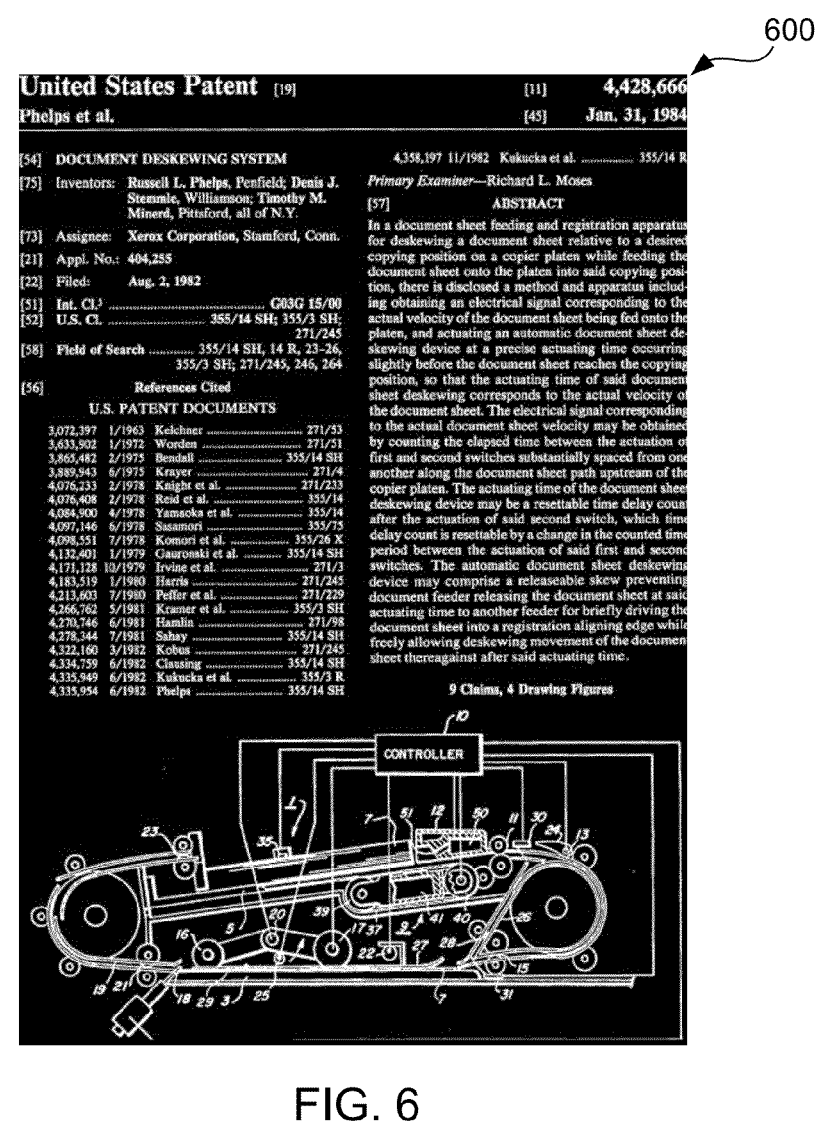
Figure 7:
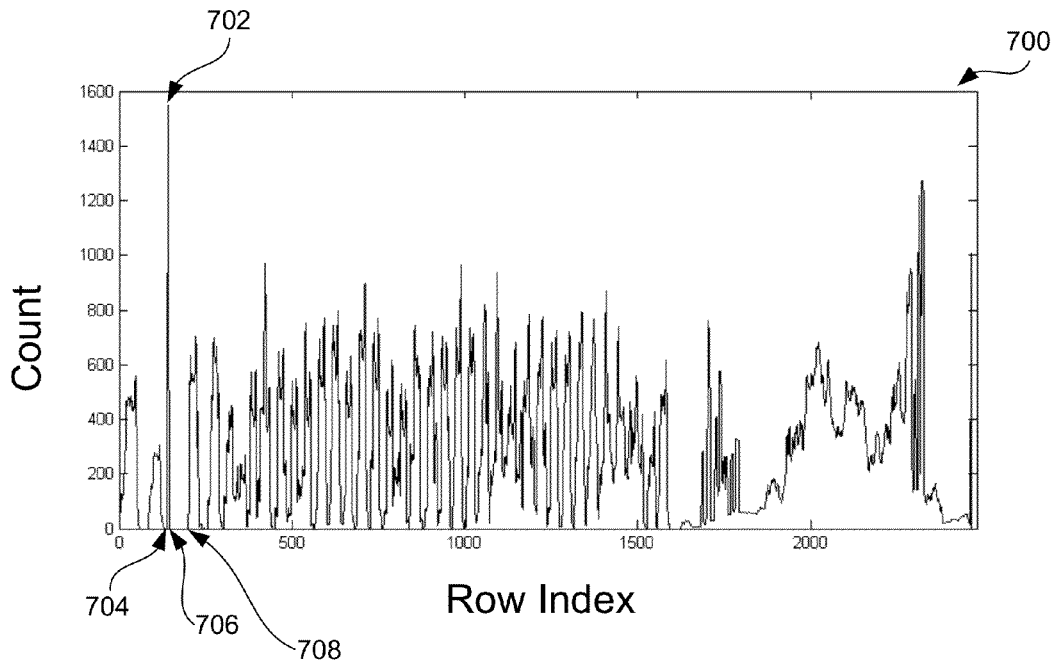
FIG. 7 is a picture depicting a horizontal-direction one-dimensional projection histogram associated with the exemplary binary image shown in FIG. 6.

For a USPTO patent document, layout analysis may be described in relation to FIG. 4. Layout analysis in these exemplary embodiments, may comprise text-column detection 400, followed by connected-component analysis 402, text-line detection 404 and INID code detection 406. Text-column detection 400 may rely on the detection of the boundaries between the three distinct regions: the header region, the main body region and the sample figure region. The position of the horizontal line that demarcates the header region may be detected by projecting the image pixel values in $I_B'$ in the horizontal direction to form a one-dimensional projection signal, which may be denoted $p_h$. An exemplary artifact-corrected and cropped USPTO patent document image 500 is depicted in FIG. 5. FIG. 6 depicts an exemplary binarized image 600 of the image 500 shown in FIG. 5. FIG. 7 shows the one-dimensional horizontal-direction projection signal 700 formed from the binary image 600 shown in FIG. 6. In some embodiments of the present invention, entries in the one-dimensional horizontal-direction projection signal 700 with a count below a minimum-count threshold may be set to zero. The locations of non-blank regions in the one-dimensional projection signal 700 may be identified and may be denoted by $\{y_{r(i)}^s, y_{r(i)}^e\}$, where $y_{r(i)}^s$ and $y_{r(i)}^u$ denote the starting row index and ending row index, respectively, of non-blank region r(i). Each non-blank region, r(i), may correspond to a text line in the image. If residual skew in the image after skew correction is considerable, multiple text lines may be merged into a single non-blank region in the one-dimensional projection signal. Blank spaces between text lines may be transformed into a succession of zeros in the one-dimensional projection signal.

The demarcation line between the header region and the main body region may be determined once the locations of non-blank regions, $\{r(i)\}$, i=1, ..., R, are obtained. In some embodiments of the present invention, the demarcation line may correspond to the narrowest non-blank region 702 in the one-dimensional horizontal-direction projection signal occurring within the first $T_R$ text lines, where the value of the threshold $T_R$ may be determined a priori. In some embodiments of the present invention, $T_R$ may be set to a value less than or equal to five. The non-blank region 702 associated with the demarcation line may be denoted by $\{y_H^s, y_H^e\}$, where $y_H^s$ 704 and $y_H^e$ 706 denote the starting row index and ending row index, respectively, of the non-blank region 702 associated with the demarcation line. The ending row index $y_H^e$ 706 may demarcate the lower boundary of the header region, and the starting row index 708 of the subsequent non-blank region, which may be denoted $y_{H+1}^2$, may demarcate the top boundary of the main body region.

In some embodiments of the present invention, the binary image may be analyzed to locate the bottom boundary of the main body region. The endpoints of the header demarcation line, H, are aligned with the outer boundaries of the text columns in the main body region. While the midpoint, which may be denoted $(x_H^m, y_H^m)$, of the header demarcation line, is closely aligned with the center column divider. In some embodiments of the present invention, these properties of the document structure may be exploited to locate the lower boundary of the two-column main body region.

A range of columns, denoted $(x_H^m-c, x_H^m+c)$, where c indicates the size of the range, centered around the midpoint of the demarcation line, may be considered for each non-blank region below H, r(i), i>H. A vertical-direction projection signal, which may be denoted $p_v^{r(i)}$, may be generated for each image non-blank region, r(i), i>H, below H, $I_B'(x, y:x_H^m-c \le x \le x_H^m+c, y_{r(i)}^s \le y \le y_{r(i)}^e)$, where $y_{r(i)}^s$ and $y_{r(i)}^e$ denote the start and end rows of non-blank region r(i), respectively. When the total number of samples in $p_v^{r(k)}$, for some k, exceeds a threshold, $T_{tot}$, it may be determined that the end of the main body region has been reached, and the lower boundary of the main body region may be set to row index $y_{r(k-1)}^e$, where r(k-1) is the non-blank region immediately previous to r(k).

In alternative embodiments of the present invention, the one-dimensional horizontal-direction projection signal may be examined to determine the lower boundary of the main body region. In these embodiments, the width of the non-blank regions below H may be examined, and when the width of a region exceeds a threshold, $T_{width}$, it may be determined that the end of the main body region has been reached, and the lower boundary of the main body region may be set to the ending row index of the non-blank region immediately previous to the region for which the width exceeds the threshold, $T_{width}$.

In some embodiments of the present invention, the vertical projection signals may be aggregated for the non-blank regions to progressively form a cumulative projection signal, which may be denoted $p_v$. The cumulative projection signal may be analyzed to determine the inner column boundaries.

Figure 8:
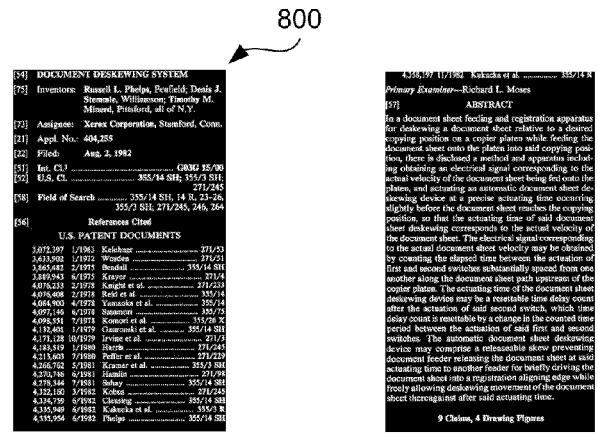
FIG. 8 is a picture depicting the detected text columns in the main body region of the exemplary binary document shown in FIG. 6.

After the boundaries of the text columns are determined, the text columns may be processed. FIG. 8 depicts the text columns 800, 802 determined according to embodiments of the present invention. Referring again to FIG. 4, text lines in each text column may be reconstructed 404 after connected component analysis 402. In some embodiments of the present invention, properties of neighboring components, for example, proximity, alignment and other properties, may be used to determine which connected components form a valid text line.

In some embodiments of the present invention, text-line reconstruction 404 may be performed according to the systems and methods disclosed in U.S. patent application Ser. No. 11/766,640, entitled "Methods and Systems for Identifying Text Orientation in a Digital Image," filed on Jun. 21, 2007, which is hereby incorporated by reference herein in its entirety.

In some embodiments of the present invention, text-line reconstruction 404 may be performed according to the systems and methods disclosed in U.S. patent application Ser. No. 11/766,661, entitled "Methods and Systems for Identifying Text Orientation in a Digital Image," filed on Jun. 21, 2007, which is hereby incorporated by reference herein in its entirety.

In alternative embodiments of the present invention, text-line reconstruction 404 may be performed according to methods and systems known in the art.

Figure 9:
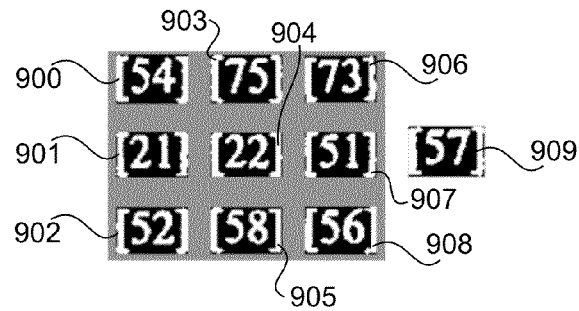
FIG. 9 is a picture depicting the INID codes detected in the text columns shown in FIG. 8.

Candidate text lines may be parsed for INID code detection 406 in order to determine the locations of the bibliographic entries in the text columns. In some embodiments of the present invention, candidate text lines composed of four components and abutting a left-side boundary of a text column may be labeled as a candidate INID-code text line. In some embodiments, a list of candidate INID-code text lines may be refined based on the height and width of a bounding box associated with a candidate INID-code text line. FIG. 9 shows the INID-code text line candidates 900-909 detected, according to embodiments of the present invention, in the exemplary text columns shown in FIG. 8.

Since the INID-code text line candidates comprise image data, their content may be analyzed to identify the numerals in the code in order to locate the "Referenced Cited" field denoted by INID code "56." In some embodiments of the present invention, INID code detection 406 may comprise processing of the candidate INID-code text line image data to refine component boundaries. In some embodiments, the aspect ratio of each connected component within an INID region may be compared against an aspect-ratio threshold, which may be denoted $T_{ar}$. If the aspect ratio of a connected component falls below $T_{ar}$, then the connected component may be further processed to determine whether it is made up of multiple components. In an exemplary embodiment, this may be done by forming a vertical projection signal and locating the column index(es) where the components connect to each other.

In some embodiments, the numerals in an INID-code text line candidate may be identified using the template matching systems and methods disclosed in U.S. patent application Ser. No. 12/126,514, entitled "Methods and Systems for Identifying the Orientation of a Digital Image," filed on May 23, 2008, which is hereby incorporated by reference herein in its entirety.

In alternative embodiments of the present invention, the numerals in an INID-code text line candidate may be identified according to template matching methods and systems known in the art.

Figure 10:
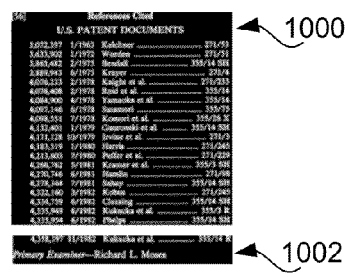
FIG. 10 is a picture depicting the regions-of-interest associated with the cited references in the exemplary text columns shown in FIG. 8.

Each identified numeral string may be compared against a list of valid INID codes, and a region-of-interest (ROI) associated with an INID code of interest may be extracted from the image data using the image coordinates of the INID codes. FIG. 10 shows two regions of interest 1000, 1002, one extracted from each column, associated with INID code "56." Each region-of-interest 1000, 1002 may be processed to extract the reference identifiers, for example, the patent numbers.

Figure 11:
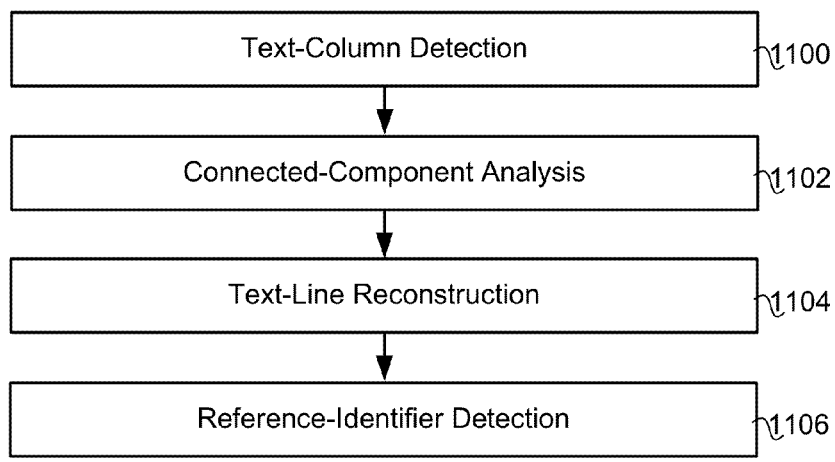
FIG. 11 is a chart showing exemplary embodiments of the present invention comprising extraction of references to auxiliary content.

In some embodiments of the present invention described in relation to FIG. 11, reference-identifier extraction 312 may comprise text-column detection 1100, connected-component analysis 1102, text-line reconstruction 1104 and reference-identifier detection 1106. In some embodiments of the present invention, a left-most column may be detected from the ROI associated with INID code "56" by forming a vertical-direction projection histogram and detecting the blank-space regions abutting the text-column Connected-component analysis 1102 and text-line reconstruction 1104 may be performed to extract candidate text segments associated with potential references, and candidate references may be detected 1106 from the candidate text segments using template matching and aspect-ratio verification. Table 1 shows a list of the cited patent numbers extracted from the exemplary ROI shown in FIG. 10.

TABLE 1

List of cited patent numbers extracted from the exemplary ROI shown in FIG. 10

| 3 | 0 | 7 | 2 | 3 | 9 | 7 |
|---|---|---|---|---|---|---|
| 3 | 6 | 3 | 3 | 9 | 0 | 1 |
| 3 | 8 | 6 | 5 | 4 | 8 | 2 |
| 3 | 3 | 8 | 9 | 9 | 1 | 3 |
| 4 | 0 | 7 | 6 | 2 | 3 | 3 |
| 4 | 0 | 7 | 6 | 4 | 0 | 8 |
| 4 | 0 | 8 | 4 | 9 | 0 | 0 |
| 4 | 0 | 9 | 7 | 1 | 4 | 6 |
| 4 | 0 | 9 | 8 | 5 | 5 | 1 |
| 4 | 1 | 3 | 2 | 4 | 0 | 1 |
| 4 | 1 | 7 | 1 | 1 | 2 | 8 |
| 4 | 1 | 8 | 3 | 5 | 1 | 9 |
| 4 | 1 | 1 | 3 | 6 | 0 | 3 |
| 4 | 2 | 6 | 6 | 7 | 6 | 2 |
| 4 | 2 | 7 | 0 | 7 | 4 | 6 |
| 4 | 2 | 7 | 8 | 3 | 4 | 4 |
| 4 | 3 | 2 | 2 | 1 | 6 | 0 |
| 4 | 3 | 3 | 4 | 7 | 5 | 9 |
| 4 | 3 | 3 | 5 | 9 | 4 | 9 |
| 4 | 3 | 3 | 5 | 9 | 5 | 4 |
| 4 | 3 | 5 | 8 | 1 | 9 | 7 |

After the reference extraction 312, the associated content may be retrieved 314. In some embodiments of the present invention, content retrieval 314 may comprise generating a database query to retrieve the content associated with the extracted references. The format of the query may be dependent on the type of structured document being analyzed. For example, for USPTO patent documents, the cited references may be retrieved from the USPTO patent database, and the query may be generated in a form consistent with that required by the database. For example, for the cited patent numbers shown in Table 1, the query may take the following form:

http://patft.uspto.gov/netacgi/nph-Parser?TERM1=
3072397+OR+3633901+OR+3865482+OR+
3389913+OR+4076233+OR+4076408+OR+
4084900+OR+4097146+OR+4098551+OR+
4132401+OR+4171128+OR+4183519+OR+
1113603+OR+4266762+OR+4270746+OR+
4278344+OR+4322160+OR+4334759+OR+
4335949+OR+4335954+OR+
4358197&Sect1=PT01&Sect2=
HITOFF&d=PALL&p=1&u=
%2Fnetahtml%2FPTO%2Fsrchnum.htm&r=
0&f=S&l=50, and auxiliary content associated with the extracted references may be retrieved from the USPTO database.

In some alternative embodiments of the present invention, a customization capability for processing different types of structured documents may be provided. These embodiments may comprise an interactive training stage in which an operator may indicate one, or more, properties of a family of documents. Exemplary properties may include the presence and sequence of bibliographic fields, for example, title, author list, affiliation, references and other bibliographic fields, the main document format, for example, number of regions, format of regions, for example, one column, two column and other formatting information, potential field codes and associated image templates and other document properties indicating document structure. The operator may specify a sequence of processing steps using an interactive workflow management utility that may allow the assembly of a number of pre-packaged processing modules into a custom workflow. Exemplary pre-packaged processing modules may include modules for skew estimation, skew correction, orientation detection, orientation correction, text line detection and other image processing modules. In some embodiments, the operator may interactively combine the desired modules in the desired order and may provide required parameter values for each module.

In alternative embodiments, a training stage may be integrated with the workflow management utility. In these embodiments, the layout information related to a specific processing module may be entered during the workflow assembly.

Although the charts and diagrams in the Figures may show a specific order of execution, it is understood that the order of execution may differ from that which is depicted. For example, the order of execution of the blocks may be changed relative to the shown order. Also, as a further example, two or more blocks shown in succession in the figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for retrieving auxiliary document content indicated in a document image associated with a United States Patent and Trademark Office patent document front page, said method comprising:
    performing layout analysis on a document image, thereby determining a first region-of-interest, wherein said performing layout analysis comprises:
        identifying a header region in said document image;
        identifying a main body region in said document image; and
        identifying a demarcation line between said header region and said main body region;
    extracting, from said first region-of-interest in said document image, a first reference to a first external content; and
    retrieving said first external content.

2. A method as described in claim 1, wherein said retrieving comprises generating a database query.

3. A method as described in claim 1 further comprising:
    receiving an input document image;
    identifying in said input document image a first artifact; and
    correcting said input document image for said first artifact to produce said document image.

4. A method as described in claim 1 further comprising:
    receiving an input document image; and
    cropping said input document image to form said document image, wherein said document image comprises the image content from said input document image.

5. A method as described in claim 1 further comprising:
    receiving an input document image; and
    binarizing said input image to form said document image.

6. A method as described in claim 1 further comprising:
    receiving an input document image;
    identifying in said input document image a first artifact;
    correcting said input document image for said first artifact to produce a corrected input document image;
    cropping said corrected input document image to form a cropped, corrected document image, wherein said cropped, corrected document image comprises the image content from said corrected input document image; and
    binarizing said cropped, corrected document image to form said document image.

7. A method as described in claim 1 further comprising:
    extracting a second reference to a second external content from said first region-of-interest; and
    retrieving said second external content.

8. A method as described in claim 7, wherein said retrieving said first external content and said retrieving said second external content comprises generating a database query.

9. A method as described in claim 1, wherein said identifying said demarcation line comprises forming a horizontal-direction one-dimensional projection histogram.

10. A method as described in claim 1, wherein said performing layout analysis comprises:
    text-column detection;
    connected-component analysis;
    text-line reconstruction; and
    reference field detection.

11. A method as described in claim 1 further comprising an interactive training stage.

12. A method for retrieving auxiliary document content indicated in a document image associated with a United States and Trademark Office patent document front page, said method comprising:
    performing layout analysis on a document image, thereby determining a first region-of-interest, wherein said determining said first region-of-interest comprises locating Internationally agreed Numbers for the Identification of (bibliographic) Data code "56" in said document image;
    extracting, from said first region-of-interest in said document image, a first reference to a first external content; and
    retrieving said first external content.

13. A method for retrieving cited United States Patent and Trademark Office (USPTO) documents indicated in a USPTO patent document, said method comprising:
    locating a header region in an image of a first page of a USPTO patent document;
    locating a main body region in said image;
    locating an Internationally agreed Numbers for the Identification of (bibliographic) Data (INID) code "56" in said main body region;
    identifying a region-of-interest based on said located INID code "56";
    extracting a first reference from said region-of-interest;
    generating a USPTO database query comprising said extracted first reference; and
    obtaining an auxiliary document using said generated USPTO database query.

14. A method as described in claim 13 further comprising identifying a demarcation line between said header region and said main body region.

15. A method as described in claim 14, wherein said identifying said demarcation line comprises forming a horizontal-direction one-dimensional projection histogram.

16. A method as described in claim 13, wherein said locating an Internationally agreed Numbers for the Identification of (bibliographic) Data (INID) code "56" comprises:
    detecting a first text column and a second text column in said main body region;
    detecting a first plurality of connected components in said first text column;
    detecting a second plurality of connected components in said second text column;
    reconstructing a first plurality of candidate text lines from said first plurality of connected components;
    reconstructing a second plurality of candidate text lines from said second plurality of connected components;
    selecting a first plurality of INID-code text line candidates from said first plurality of candidate text lines based on location;
    selecting a second plurality of INID-code text line candidates from said second plurality of candidate text lines based on location; and performing template matching on said first plurality of INID-code text line candidates and said second plurality of INID-code text line candidates.

17. A method as described in claim 13 further comprising:

receiving an input document image;

identifying in said input document image a first artifact;

correcting said input document image for said first artifact to produce a corrected input document image;

cropping said corrected input document image to form a cropped, corrected document image, wherein said cropped, corrected document image comprises the image content from said corrected input document image; and binarizing said cropped, corrected document image to form said image of said first page of said United States Patent and Trademark Office patent document.

* * * * *